(12) United States Patent  
Matsumoto et al.

(10) Patent No.: US 8,920,904 B2
(45) Date of Patent: Dec. 30, 2014

(54) TOUCH PANEL AND METHOD OF PRODUCING THE SAME

(71) Applicant: Panasonic Corporation, Osaka (JP)

(72) Inventors: Kenichi Matsumoto, Osaka (JP); Koji Tanabe, Osaka (JP); Tetsutaro Nasu, Nara (JP); Keishiro Murata, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 157 days.

(21) Appl. No.: 13/669,545

(22) Filed: Nov. 6, 2012

(65) Prior Publication Data

US 2013/0122251 A1 May 16, 2013

(30) Foreign Application Priority Data

Nov. 11, 2011 (JP) .................................. 2011-247175
May 9, 2012 (JP) .................................. 2012-107247

(51) Int. Cl.
*G06F 3/041* (2006.01)
*G06F 3/045* (2006.01)
*B32B 7/02* (2006.01)
*D06N 7/04* (2006.01)
*G06F 3/044* (2006.01)

(52) U.S. Cl.
CPC ...................................... *G06F 3/044* (2013.01)
USPC ........... 428/141; 428/215; 156/182; 156/249; 345/173; 345/174; 345/12

(58) Field of Classification Search
None
See application file for complete search history.

(56) References Cited

U.S. PATENT DOCUMENTS

| | | | |
|---|---|---|---|
| 2004/0130536 A1* | 7/2004 | Tanabe | 345/173 |
| 2005/0046622 A1* | 3/2005 | Nakanishi et al. | 345/173 |
| 2009/0091549 A1 | 4/2009 | Matsumoto et al. | |
| 2009/0179871 A1* | 7/2009 | Tatehata et al. | 345/174 |
| 2010/0220074 A1* | 9/2010 | Irvin et al. | 345/174 |
| 2011/0063240 A1* | 3/2011 | Tanabe | 345/173 |

FOREIGN PATENT DOCUMENTS

JP 2009-093397 4/2009

* cited by examiner

*Primary Examiner* — David Sample
*Assistant Examiner* — Nicole T Gugliotta

(57) ABSTRACT

A touch panel includes a cover substrate, an upper resin layer, upper conductive layers, a lower resin layer, lower conductive layers, and a protective layer. The upper conductive layers are in contact with the upper resin layer on the side opposite to the cover substrate. The lower resin layer is in contact with the upper conductive layers and the upper resin layer. The lower conductive layers are provided on the side of the lower resin layer opposite to the upper conductive layers with the lower resin layer placed between the lower conductive layers and the upper conductive layers. The protective layer is provided on the surface of the lower resin layer on which the lower conductive layers are formed. Each of the upper resin layer and the lower resin layer is formed of a uniform material.

7 Claims, 10 Drawing Sheets

TOUCH PANEL AND METHOD OF PRODUCING THE SAME

BACKGROUND

1. Technical Field

The technical field relates to a touch panel mainly used for operating various types of electronic devices and to a method of producing the touch panel.

2. Background Art

In recent years, electronic devices such as a mobile phone and an electronic camera have achieved higher functionality and diversification in various types. Following this trend, devices having a light-transmissive touch panel attached on the front surface of the display element such as a liquid crystal display element have been increasing. When using such a device, a user touches the touch panel with his or her finger or something else while viewing images on the display element behind the touch panel through the touch panel to change various functions of the device. This situation demands a touch panel easy to view and reliably operable.

SUMMARY

An exemplary related art touch panel will be described with reference to FIG. 10. The dimensions of the drawing are partly enlarged to clarify the configuration. FIG. 10 is an exploded perspective view of the related art touch panel. This touch panel includes upper substrate 1, upper conductive layers 2, upper electrodes 3, lower substrate 4, lower conductive layers 5, lower electrodes 6, and cover substrate 7.

Film-like, light-transmissive upper substrate 1 has a thickness of around 50 to 125 µm. Upper conductive layers 2, which are formed of indium tin oxide for instance, light-transmissive, and substantially strip-shaped, are arranged crosswise on upper substrate 1. One end of each of upper electrodes 3 made of silver or carbon, for instance, is connected to one end of respective one of upper conductive layers 2, and another end of upper electrodes 3 extends to the outer circumferential front end of upper substrate 1. Upper electrodes 3 extend lengthwise, orthogonally to the direction in which upper conductive layers 2 extend.

Film-like, light-transmissive lower substrate 4 has a thickness of around 50 to 125 µm. Lower conductive layers 5, which are formed of indium tin oxide, for instance, light-transmissive, and substantially strip-shaped, are arranged lengthwise, orthogonally to the direction in which upper conductive layers 2 are arranged, on the top surface of lower substrate 4. One end of each of lower electrodes 6 made of silver or carbon, for instance, is connected to one end of respective one of lower conductive layers 5, and another end of each of lower electrodes 6 extends to the outer peripheral front end of lower substrate 4. Lower electrodes 6 extend lengthwise, parallel to lower conductive layers 5.

Cover substrate 7, which is plate-like or film-like, and light-transmissive, has a thickness of around 0.3 to 2 mm. Upper substrate 1 is layered on the top surface of lower substrate 4, and cover substrate 7 is layered on the top surface of upper substrate 1. These substrates are bonded together with an adhesive (not shown) or the like to form a touch panel.

The touch panel thus structured is placed on the front surface of a display element such as a liquid crystal display element in order to be attached to an electronic device. Upper electrodes 3 and lower electrodes 6 extending to the outer circumferential front end are electrically connected to the electronic circuit (not shown) of the device through a flexible wiring board, a connector (not shown) or the like.

In the above configuration, a voltage is successively applied to upper electrodes 3 and lower electrodes 6 from the electronic circuit. In this state, when a user operates the device by touching the top surface of cover substrate 7 with his or her finger or something else according to an image on the display element behind the touch panel, the capacitance between upper conductive layers 2 and lower conductive layers 5 changes at the position where the operation has been performed. The electronic circuit detects such a position through the change, thus the various functions of the device are changed.

In other words, with menu items displayed on the display element behind the touch panel, a user touches the top surface of cover substrate 7 on a desired menu item with his or her finger or something else. Then, part of electric charge moves to the finger to change the capacitance between upper conductive layers 2 and lower conductive layers 5 at the position where the operation has been performed. The electronic circuit detects the change to determine the desired menu item.

A touch panel according to embodiments includes a cover substrate, an upper resin layer, strip-shaped upper conductive layers, a lower resin layer, strip-shaped lower conductive layers, and a protective layer. The upper resin layer is formed on the cover substrate. The upper conductive layers are in contact with the upper resin layer on the surface opposite to the cover substrate and are arranged in a first direction. The lower resin layer is in contact with the upper conductive layers and the upper resin layer. The lower conductive layers are provided on the surface of the lower resin layer opposite to the upper conductive layers with the lower resin layer placed between the upper and lower conductive layers, and are arranged in a second direction orthogonal to the first direction. The protective layer is provided on the surface of the lower resin layer on which the lower conductive layers are formed. Each of the upper and lower resin layers is formed of a uniform material.

DETAILED DESCRIPTION OF PREFERRED EMBODIMENTS

Before a description of embodiments, problems of a related art touch panel are described. The touch panel shown in FIG.

10 is formed of film-like upper substrate 1 and film-like lower substrate 4 both layered on the bottom surface of cover substrate 7. This structure results in a large total thickness and in a light transmittance of around 87%. Thus, it may be slightly hard to see menu items on the display element behind the touch panel.

Hereinafter, a touch panel according to embodiments with reference to the related drawings. Here, the dimensions of the drawings are partly enlarged to clarify the configuration.

Exemplary Embodiment

Figure 1:
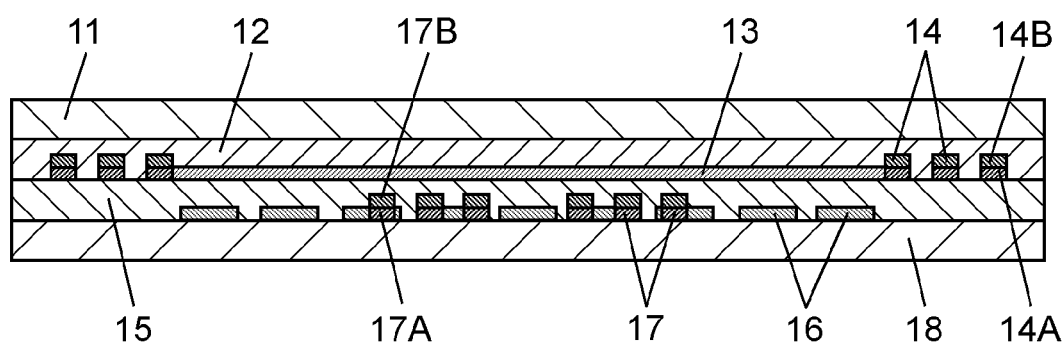
FIG. 1 is a sectional view of a touch panel according to an embodiment.
Figure 2:
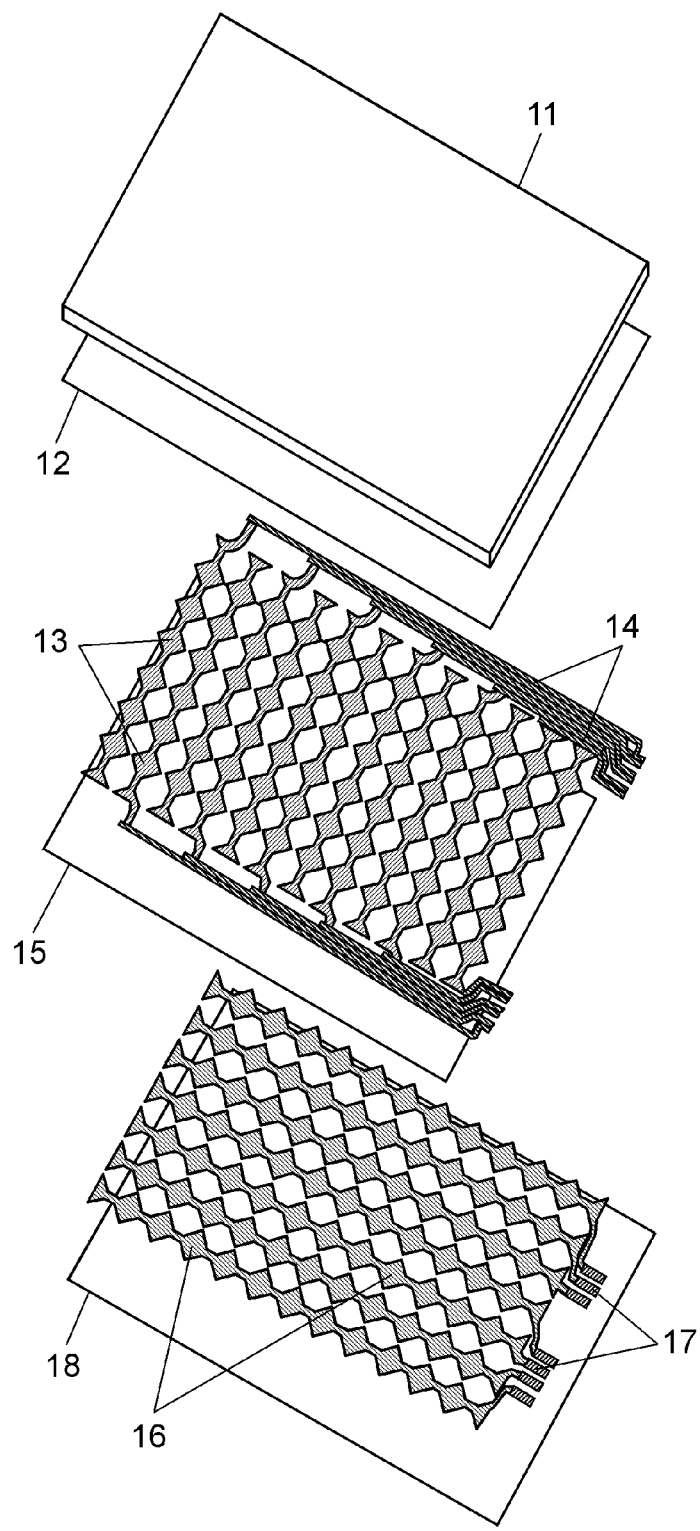
FIG. 2 is an exploded perspective view of the touch panel shown in FIG. 1.

FIGS. 1 and 2 are respectively a sectional view and an exploded perspective view of a touch panel according to an embodiment. This touch panel includes cover substrate 11, upper resin layer 12, strip-shaped upper conductive layers 13, lower resin layer 15, strip-shaped lower conductive layers 16, and protective layer 18. Upper resin layer 12 is formed on cover substrate 11. In FIGS. 1 and 2, upper resin layer 12 is formed on the under side of cover substrate 11. Upper conductive layers 13, arranged in a first direction, are in contact with upper resin layer 12 on the side opposite to cover substrate 11. Lower resin layer 15 is in contact with layers 13 and upper resin layer 12. Lower conductive layers 16 are provided on the surface of lower resin layer 15 opposite to layers 13. Lower resin layer 15 is placed between layers 16 and layers 13. That is, a given spacing is provided between layers 16 and 13. Layers 16 are arranged in a second direction orthogonal to the first direction. Protective layer 18 is provided on the surface of lower resin layer 15 on which layers 16 are formed. Each of upper resin layer 12 and lower resin layer 15 is formed of a uniform material.

Hereinafter, a description is made with the directions of up and down, front and back, and right and left, according to a view illustrated, but these directions are not absolute. The touch panel may be used upside down, for instance.

Light-transmissive cover substrate 11 is formed of glass, polymethyl methacrylate, or polycarbonate, for instance. Cover substrate 11 is plate-like or film-like with a thickness of around 0.3 to 2 mm.

A light-transmissive upper resin layer 12 is provided on the bottom surface of substrate 11. Upper resin layer 12 has a thickness of around 10 to 50 μm. It is preferable that layer 12 is formed of ultraviolet curable acrylate resin, thermosetting epoxy resin, thermosensitive polyolefin resin or the like and its Martens hardness is 1 N/mm² or greater.

Upper conductive layers 13 and upper electrodes 14 are provided on the bottom surface of layer 12. Upper conductive layers 13 are light-transmissive and substantially strip-shaped, and formed of indium tin oxide, tin oxide or the like, and are arranged crosswise. Upper electrodes 14 extend lengthwise, orthogonally to the direction in which upper conductive layers 13 extend. One end of each of upper electrodes 14 is connected to one end of respective one of upper conductive layers 13, and another end of upper electrodes 14 extends to the outer circumferential front end of upper resin layer 12. Upper electrode 14 is formed by layering metal layer 14B (e.g. copper foil) on conductive layer 14A (e.g. indium tin oxide or tin oxide) by vapor deposition, sputtering or the like method.

Lower resin layer 15 (similar to upper resin layer 12) is formed and laminated on the bottom surface of layers 13. It is preferable that lower resin layer 15 is also resin-hardened matter that is ultraviolet curable, thermosetting, or thermosensitive.

Lower conductive layers 16 and lower electrodes 17 formed on the bottom surface of lower resin layer 15. Layers 16 are substantially strip-shaped and light-transmissive, similarly to upper conductive layers 13. Layers 16 are arranged lengthwise, orthogonally to the direction in which layers 13 are arranged. Lower electrode 17 is formed of conductive layer 17A and metal layer 17B stacked onto layer 17A, similarly to upper electrode 14. One end of each of lower electrodes 17 is connected to one end of respective one of lower conductive layers 16, and another end of each of lower electrodes 17 extends to the outer circumferential front end of lower resin layer 15. Lower electrodes 17 extend lengthwise, parallel to layers 16.

Each of upper conductive layers 13 and lower conductive layers 16 is formed of quadrate parts linked in a strip shape. Two adjacent layers 13 are provided therebetween with substantially quadrate gaps. Similarly, two adjacent layers 16 are provided therebetween with substantially quadrate gaps. In a state where layers 13 and 16 face each other via lower resin layer 15, the quadrate parts are arranged so as to alternately overlap vertically with the respective gaps.

Protective layer 18 is formed of a material same as that of upper resin layer 12 and lower resin layer 15 and is laminated onto the bottom surface of lower resin layer 15. It is preferable that the bottom surface of lower resin layer 15 has a roughness of 0.0001 to 0.5 μm and undulation of 0.001 to 10 μm.

Next, a method of producing such a touch panel is described with reference to FIGS. 3A through 5D. These figures are sectional views illustrating a procedure of producing the touch panel shown in FIG. 1.

Figure 3A:
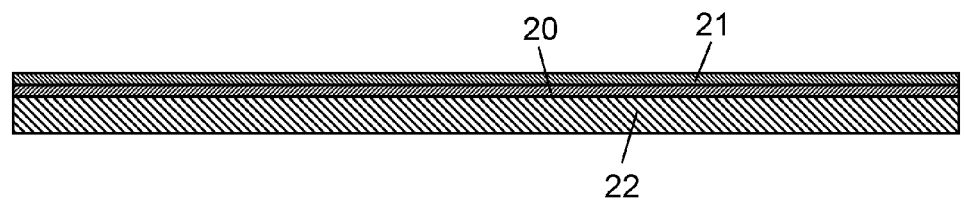
FIGS. 3A through 3D are sectional views illustrating a procedure of producing the touch panel shown in FIG. 1.
Figure 3B:
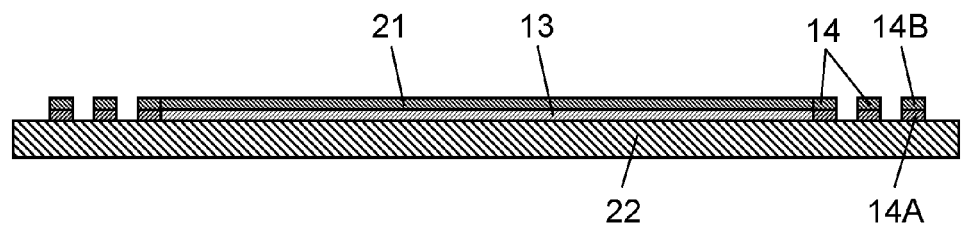
Figure 3C:
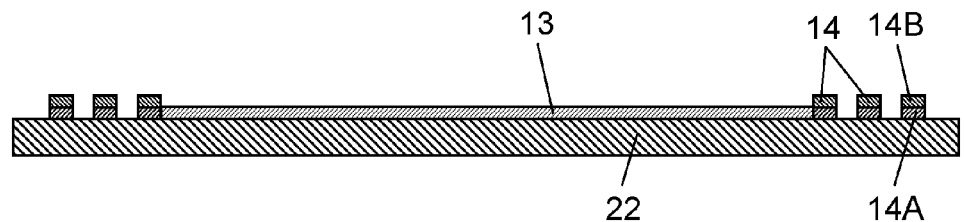

First, as shown in FIG. 3A, conductive thin film 20 (e.g. indium tin oxide) is formed on the entire top surface of film-like upper base plate 22 (e.g. polyethylene terephthalate) and metal thin film 21 (e.g. copper foil) is laminated onto film 20. Then, mask patterns of an insulating resin coating (e.g. dry film resist) are formed on the top surface of metal thin film 21 by photoresist technique or the like. The mask patterns correspond to upper conductive layers 13 and upper electrodes 14. After that, upper base plate 22 is immersed in an etching liquid and unnecessary parts of metal thin film 21 and conductive thin film 20 are removed by dissolving. Thereby, upper electrodes 14 and upper conductive layers 13 are formed as shown in FIG. 3B. Upper electrode 14 is formed of conductive layer 14A and metal layer 14B laminated onto conductive layer 14A. At this step, metal thin film 21 is laminated on layers 13.

After forming a coating covering upper electrodes 14 by photoresist technique or the like, upper base plate 22 in such a state is immersed in an etching liquid different from the above. By this operation, metal thin film 21 on upper conductive layers 13 is removed by dissolving to form upper electrodes 14 and substantially strip-shaped layers 13 on the top surface of upper base plate 22 as shown FIG. 3C. One end of each of upper electrodes 14 is connected to one end of respective one of layers 13, and another end of each of upper electrodes 14 extends to the outer circumferential front end. Upper electrode 14 is composed of conductive layer 14A and metal layer 14B stacked onto layer 14A.

Figure 3D:
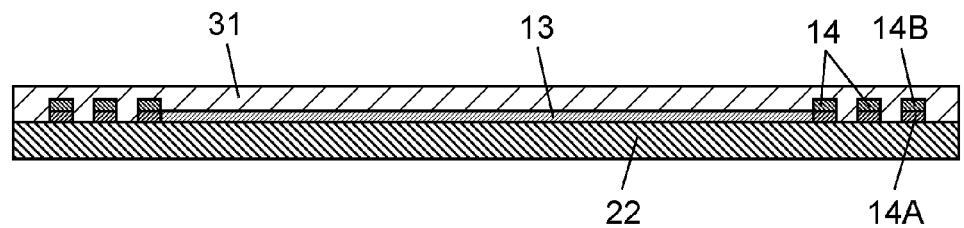

After that, as shown in FIG. 3D, upper bonding layer 31 is formed on the entire top surface of upper base plate 22 so as to cover upper conductive layers 13 and upper electrodes 14 by coating or printing. In other words, upper base plate 22 provided with layers 13, upper electrodes 14, and upper bonding layer 31 on the top surface of upper base plate 22 is produced.

Figure 4A:
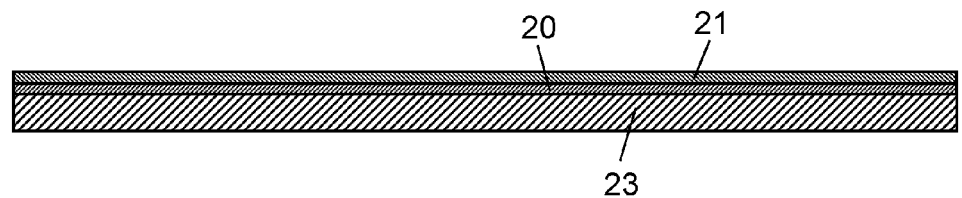
FIGS. 4A through 4D are sectional views illustrating a procedure of producing the touch panel shown in FIG. 1.
Figure 4B:
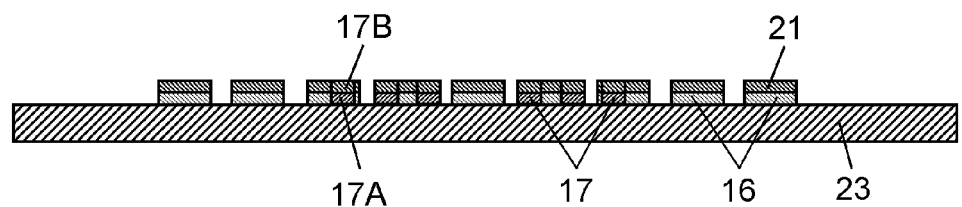
Figure 4C:
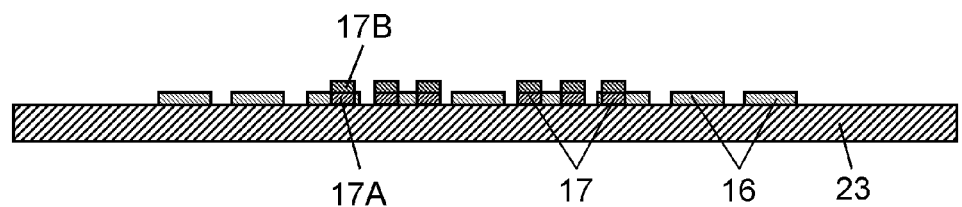

Meanwhile, in the same way as shown in FIG. 4A, conductive thin film 20 is formed on the entire top surface of lower base plate 23 and metal thin film 21 is laminated onto film 20. Then, mask patterns of an insulating resin coating (e.g. dry film resist) are formed on the top surface of metal thin film 21 by photoresist technique or the like. The mask patterns correspond to lower conductive layers 16 and lower electrodes 17. After that, lower base plate 23 is immersed in an etching liquid and unnecessary parts of metal thin film 21 and conductive thin film 20 are removed by dissolving to form lower electrodes 17 and lower conductive layers 16 as shown in FIG. 4B. Lower electrode 17 is as well formed of conductive layer 17A and metal layer 17B laminated onto conductive layer 17A. At this step, metal thin film 21 is laminated on lower conductive layers 16.

After forming a coating covering lower electrodes 17 by photoresist technique or the like, lower base plate 23 in such a state is immersed in an etching liquid different from the above. By this operation, metal thin film 21 on lower conductive layers 16 is removed by dissolving to form lower electrodes 17 and substantially strip-shaped layers 16 on the top surface of lower base plate 23 as shown FIG. 4C. One end of each of lower electrodes 17 is connected to one end of respective one of layers 16 and another end of each of lower electrodes 17 extends to the outer circumferential front end. Lower electrode 17 is composed of conductive layer 17A and metal layer 17B stacked onto layer 17A.

Figure 4D:
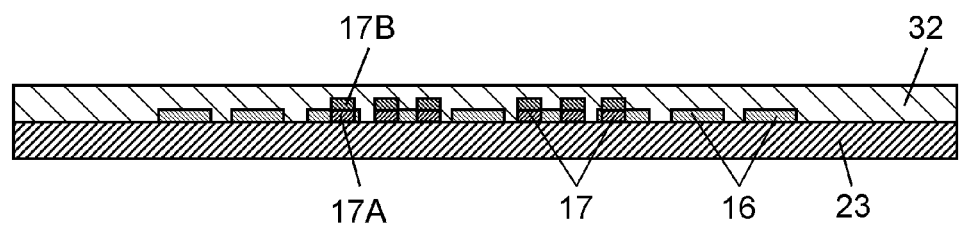

After that, as shown in FIG. 4D, lower bonding layer 32 is formed on the entire top surface of lower base plate 23 so as to cover lower conductive layers 16 and lower electrodes 17 by coating or printing. In other words, lower base plate 23 provided with layers 16, lower electrodes 17 and lower bonding layer 32 on the top surface of lower base plate 23 is produced.

Figure 5A:
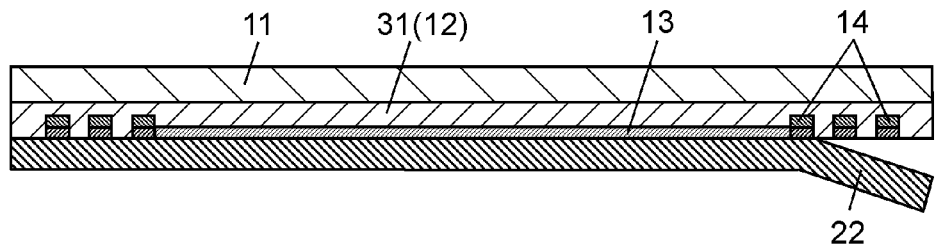
FIGS. 5A through 5D are sectional views illustrating a procedure of producing the touch panel shown in FIG. 1.

Next, as shown in FIG. 5A, upper base plate 22 provided with upper conductive layers 13 and upper electrodes 14 is bonded onto the bottom surface of cover substrate 11 through upper bonding layer 31. After that, upper bonding layer 31 is hardened to form upper resin layer 12.

When ultraviolet curable resin (e.g. acrylate resin) is used for upper bonding layer 31, ultraviolet light is applied to harden upper bonding layer 31. When thermosetting resin (e.g. epoxy resin) is used, heat is applied. When thermosensitive resin (e.g. polyolefin resin) is used, entire parts are heated while cover substrate 11 is placed on upper bonding layer 31 on the top surface of upper base plate 22. Then, after upper bonding layer 31 once softens and is bonded to cover substrate 11, layer 31 is cooled down and is hardened to form upper resin layer 12.

Figure 5B:
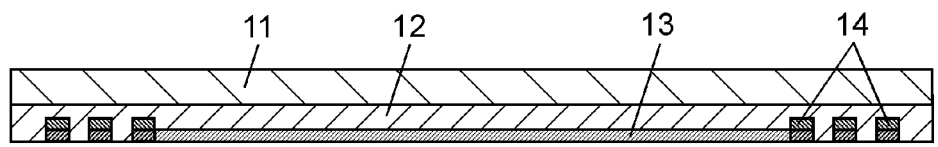

Next, upper base plate 22 is detached (peeled off), and upper conductive layers 13, upper electrodes 14, and upper resin layer 12 are transferred onto the bottom surface of cover substrate 11 as shown in FIG. 5B. Here, it is preferable that upper resin layer 12 has a Martens hardness of 1 N/mm$^2$ or greater. With upper resin layer 12 having such a Martens hardness, upper base plate 22 can be easily detached. In other words, deformation of upper resin layer 12 due to adhering to upper base plate 22, thereby forming the surface of upper resin layer 12 uneven, and damage of upper conductive layers 13 and upper electrodes 14 are prevented.

Figure 5C:
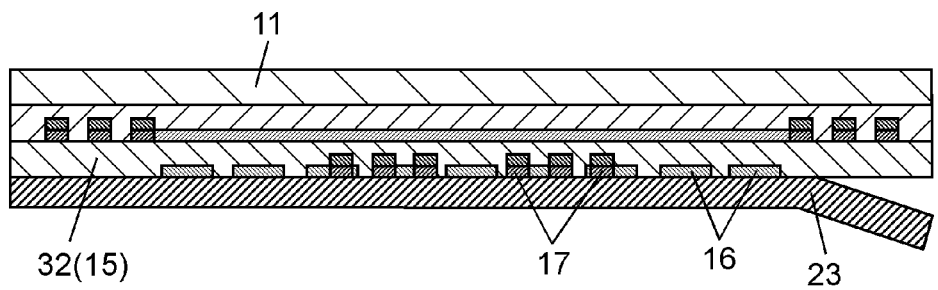

After that, as shown in FIG. 5C, lower base plate 23 provided with lower conductive layers 16 and lower electrodes 17 is bonded onto the bottom surface of upper resin layer 12 through lower bonding layer 32. Then in the same way as the above, ultraviolet light or heat is applied to harden lower bonding layer 32.

Figure 5D:
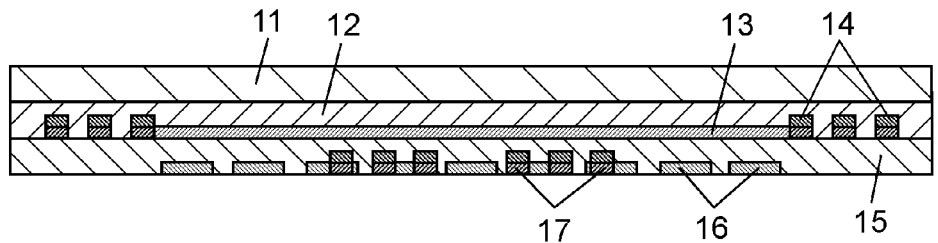

Further, lower base plate 23 is detached (peeled off) and lower conductive layers 16, lower electrodes 17, and lower resin layer 15 are transferred onto the bottom surface of upper resin layer 12 as shown in FIG. 5D. In this way, upper conductive layers 13 and upper electrodes 14 are formed under the bottom surface of cover substrate 11 via upper resin layer 12. Lower conductive layers 16 and lower electrodes 17 are formed and laminated under the bottom surface of upper conductive layers 13 via lower resin layer 15. A Martens hardness of lower resin layer 15 of 1 N/mm$^2$ or greater allows lower base plate 23 to be easily detached from lower resin layer 15.

After that, protective layer 18 is formed on the bottom surface of lower resin layer 15 to complete the touch panel as shown in FIG. 1. To form protective layer 18, the material of protective layer 18 is placed on a smooth plate (e.g. a glass or fluorine-coated metal plate) that is easily separated from the hardened resin. Then, ultraviolet light or heat is applied with pressure slightly exerted so as to harden the material of protective layer 18. In this way, the bottom surface of protective layer 18 can be made to a mirror-smooth state with a surface roughness of 0.0001 to 0.5 µm and undulation of 0.001 to 10 µm.

As described above, the touch panel shown in FIG. 1 can be produced in such a manner in which upper bonding layer 31 and lower bonding layer 32 are successively laminated onto cover substrate 11. However, the touch panel shown in FIG. 1 can be produced even by a method other than that mentioned above. Next, such a method is described referring to FIGS. 6A through 7B. The figures are sectional views illustrating another procedure of producing the touch panel shown in FIG. 1.

Figure 6A:
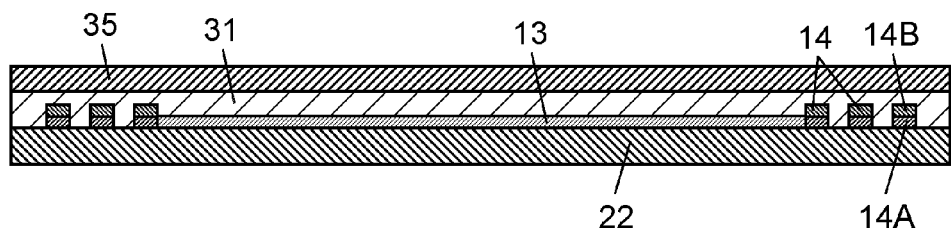
FIGS. 6A through 6D are sectional views illustrating another procedure of producing the touch panel shown in FIG. 1.
Figure 6B:
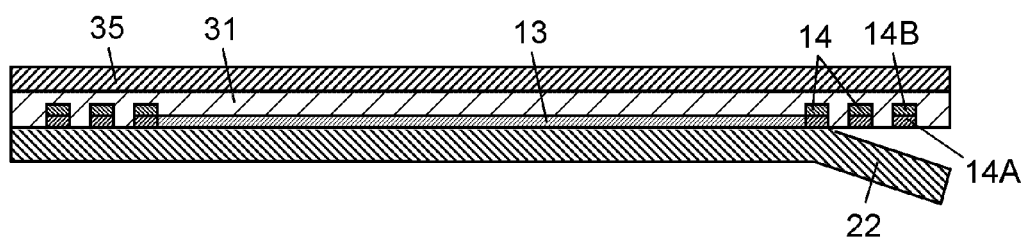

First, as described referring FIGS. 3A through 3D, upper conductive layers 13 and upper electrodes 14 are formed on upper base plate 22 and upper bonding layer 31 is formed on layers 13 and electrodes 14. Then, as shown in FIG. 6A, release paper 35 is placed onto upper bonding layer 31. Then, as shown in FIG. 6B, upper base plate 22 is detached without hardening upper bonding layer 31.

Figure 6C:
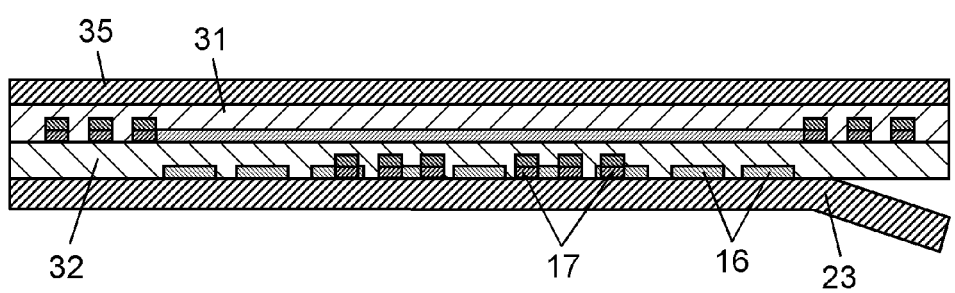

Next, lower base plate 23 provided with lower conductive layers 16, lower electrodes 17, and lower bonding layer 32 formed thereon, shown in FIG. 4D, is bonded onto the surface from which upper base plate 22 has been detached. At this moment, they are bonded so that lower bonding layer 32 is in contact with upper conductive layers 13, upper electrodes 14, and upper bonding layer 31. After that, as shown in FIG. 6C, lower base plate 23 is detached without hardening lower bonding layer 32.

Figure 6D:
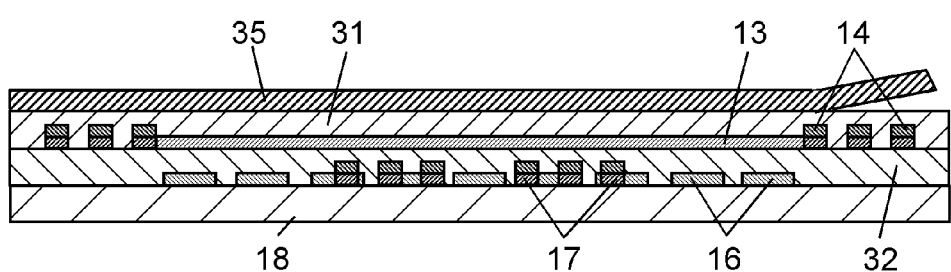

Then, as shown in FIG. 6D, protective layer 18 is formed on the surface from which lower base plate 23 has been detached. After that, release paper 35 is removed (peeled off) from upper bonding layer 31, upper bonding layer 31 is stuck onto cover substrate 11, and upper bonding layer 31 and lower bonding layer 32 are hardened. Here, in the case that protective layer 18 is formed of a same material as that of upper bonding layer 31 and lower bonding layer 32, protective layer 18 as well may be hardened at this step.

Figure 7A:
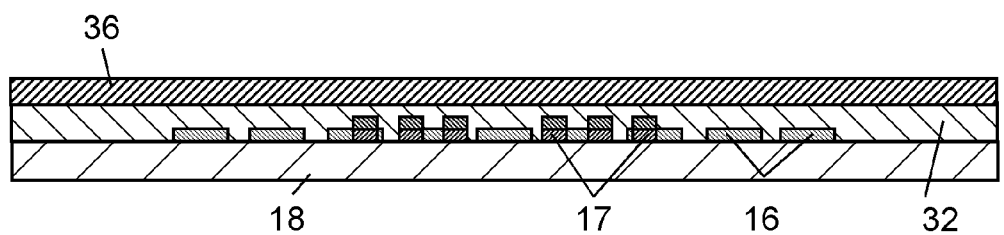
FIGS. 7A and 7B are sectional views illustrating yet another procedure of producing the touch panel shown in FIG. 1.
Figure 7B:
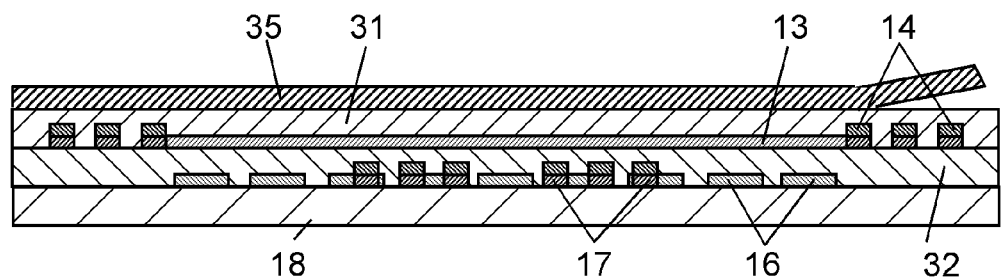

Alternatively, as shown in FIG. 4D, after forming lower conductive layers 16, lower electrodes 17, and lower bonding layer 32 on lower base plate 23, release paper 36 is placed onto lower bonding layer 32 as shown in FIG. 7A. Then, after detaching lower base plate 23, protective layer 18 is formed on the surface from which lower base plate 23 has been detached. Then, release paper 36 is removed from lower bonding layer 32 on which protective layer 18 has been formed. Then, as shown in FIG. 6B, lower bonding layer 32 is stuck onto the surface of upper bonding layer 31 in a state in which upper conductive layers 13 and upper electrodes 14 are formed thereon and release paper 35 is stuck thereto, from which upper base plate 22 has been removed. Even in this way, as shown in FIG. 7B, a laminated body of the same structure as that of FIG. 6D can be produced. In the following same way, the touch panel shown in FIG. 1 can be produced.

A touch panel produced by any one of the above methods is placed on the front surface of a display element such as a liquid crystal display element. Then, upper electrodes 14 and lower electrodes 17 extending to the outer circumferential front end are electrically connected to the electronic circuit (not shown) of a device through a flexible wiring board, a connector (not shown) and the like.

Figure 8A:
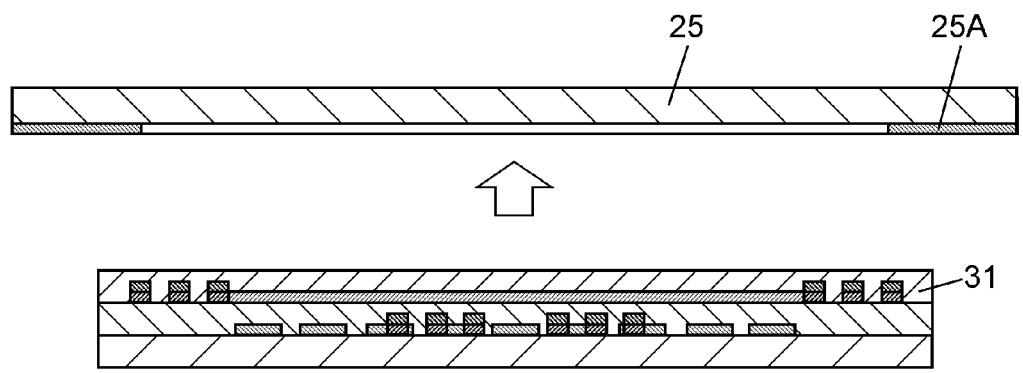
FIGS. 8A and 8B are sectional views illustrating a procedure of producing another touch panel according to the embodiment.
Figure 8B:
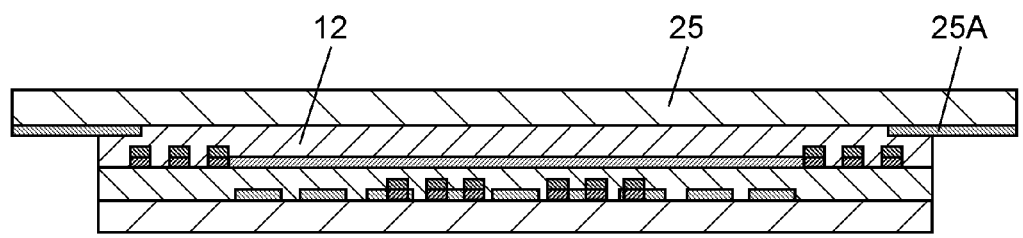

As shown in the sectional views of FIGS. 8A and 8B, cover substrate 25 may be used instead of cover substrate 11. Substrate 25 is made of glass, acrylic or the like and is plate-like or film-like, having substantially frame-like, nontransparent decorated part 25A formed on the outer circumferential bottom surface. The touch panel may be produced by bonding the bottom surface of cover substrate 25 and upper bonding layer 31 together.

In the above configuration, a voltage is successively applied to upper electrodes 14 and lower electrodes 17 from the electronic circuit. In this state, a user operates the device by making his or her finger or something else close to the top surface of cover substrate 11 or 25 (or by touching the top surface of cover substrate 11 or 25) according to an image on the display element behind the touch panel. Then, the capacitance between upper conductive layers 13 and lower conductive layers 16 changes at the position where the operation has been performed. The electronic circuit detects such a position, which changes the various functions of the device.

In other words, while menu items are displayed on the display element behind the touch panel, a user makes his or her finger or something else close to the top surface of cover substrate 11 or 25 (or touches the top surface of cover substrate 11 or 25) above a desired menu item. Then, the finger conducts part of the electric charge to change the capacitance between upper conductive layers 13 and lower conductive layers 16 of the touch panel at the position where the operation has been performed. The electronic circuit detects the change, which allows the desired menu item to be selected.

In this embodiment, substantially strip-shaped upper conductive layers 13 are provided on the bottom surface of the cover substrate through upper resin layer 12. On the other hand, substantially strip-shaped lower conductive layers 16 arranged in a direction orthogonal to layers 13 are formed in a layered manner on the bottom surface of layers 13 via layer 15. This structure makes the touch panel thinner as a whole and increases the light transmittance.

Figure 10:
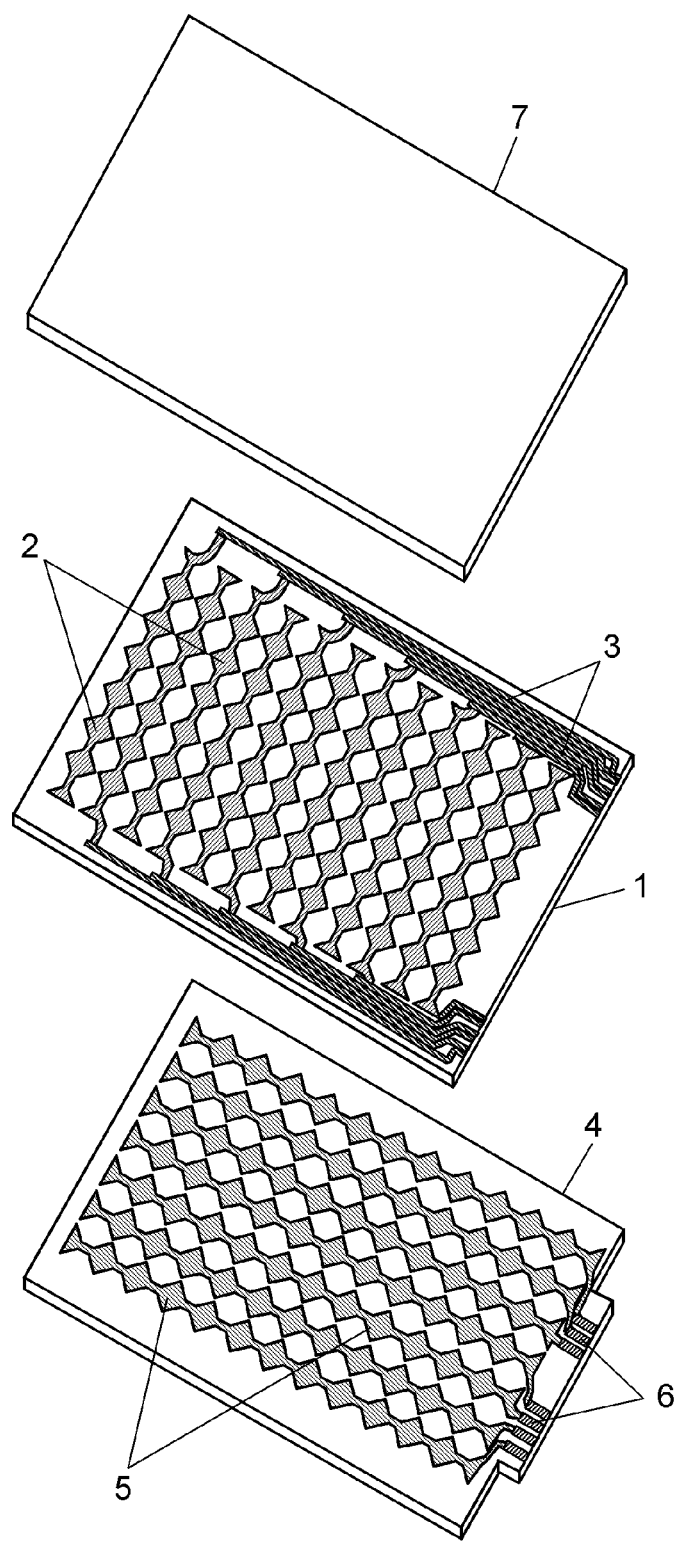
FIG. 10 is an exploded perspective view of a related art touch panel.

Accordingly, unlike the touch panel shown in FIG. 10, film-like upper and lower substrates as thick as around 50 to 125 μm are not necessary. In this embodiment, upper resin layer 12 and lower resin layer 15 have a thickness of around 10 to 50 μm. Upper conductive layers 13 are formed under the bottom surface of the cover substrate via upper resin layer 12. Lower conductive layers 16 are formed under layers 13 via lower resin layer 15. This structure allows the light transmittance to be around 91%. Consequently, a user can view images on the display element behind the touch panel easily and operate the device easily and reliably.

As described above, a touch panel is produced as follows as an example in this embodiment. Upper conductive layers 13, upper electrodes 14, and upper bonding layer 31 are formed on the top surface of upper base plate 22. Lower conductive layers 16, lower electrodes 17, and lower bonding layer 32 are formed on the top surface of lower base plate 23. After that, upper conductive layers 13, upper electrodes 14, and upper bonding layer 31 are transferred from upper base plate 22 onto the bottom surface of cover substrate 11, and lower conductive layers 16, lower electrodes 17, and lower bonding layer 32 are transferred from lower base plate 23 onto the further bottom surface. Forming each layer in a layered manner allows producing a touch panel relatively easily.

Meanwhile, in a case where upper conductive layers 13 and lower conductive layers 16 are made of indium tin oxide or the like, they may be unfavorably caught in sight. To make them inconspicuous, an optical adjusting layer of silicon oxide, titanium oxide, niobium oxide or the like may be formed on the top and/or bottom surfaces of layers 13 and 16. The optical adjusting layer can be formed by sputtering such an oxide or by coating a resin film with fine powder of such an oxide dispersed thereinto. In this case as well, such material has only to be formed together with layers 13 and 16 on the top surface of upper base plate 22 and lower base plate 23. Alternatively, high-refractive-index microparticles (e.g. zirconium oxide) or low-refractive-index microparticles (e.g. fluorinated resin or fluoride) may be mixed into upper resin layer 12 and/or lower resin layer 15. In this case, it is preferable that microparticles with a particle diameter of less than 0.1 μm be kneaded into material of upper bonding layer 31 and lower bonding layer 32 in order to achieve adequate transparency of upper resin layer 12 and lower resin layer 15. As described above, layers 12 and 15 may contain a material other than resin as long as they are formed of a uniform material.

Further, layers 12 and 15 having a Martens hardness of 1 $N/mm^2$ or greater prevent their surfaces from being uneven, and upper conductive layers 13 and upper electrodes 14 from being damaged. That is, upper base plate 22 can be easily detached from upper resin layer 12, and lower base plate 23 can be easily detached from lower resin layer 15. Therefore, upper conductive layers 13, lower conductive layers 16, and others can be reliably transferred to the bottom surfaces of upper bonding layer 31 and lower bonding layer 32.

The above description is made of a case where both upper resin layer 12 and lower resin layer 15 are formed with a Martens hardness of 1 $N/mm^2$ or greater, but only one of them may be so.

To use ultraviolet curable acrylate resin, thermosetting epoxy resin or the like for upper bonding layer 31 and lower bonding layer 32, layers 31 and 32 can be formed by coating or printing as described above. Alternatively, they may be formed by sticking sheet-like upper bonding layer 31 and lower bonding layer 32 onto the top surfaces of upper base plate 22 and lower base plate 23. This manner allows forming upper resin layer 12 and lower resin layer 15 in a uniform thickness.

Upper conductive layers 13 and lower conductive layers 16 are light-transmissive. On the other hand, metal layer 14B of upper electrode 14 and metal layer 17B of lower electrode 17 are not light-transmissive. Accordingly, when hardening upper bonding layer 31 and lower bonding layer 32 made of ultraviolet curable acrylate resin by applying ultraviolet light, they sometimes harden insufficiently on the top and bottom surfaces of metal layers 14B and 17B when metal layers 14B and 17B have a large width. Hereinafter, a description is made of a configuration for solving such a problem, referring to FIGS. 9A through 9C. These figures are partial plan views of a touch panel according to the embodiment.

Figure 9A:
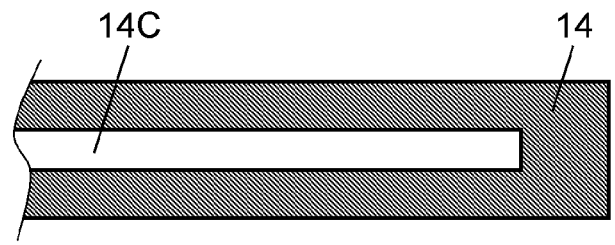
FIGS. 9A through 9C are partial plan views of a touch panel according to the embodiment.
Figure 9B:
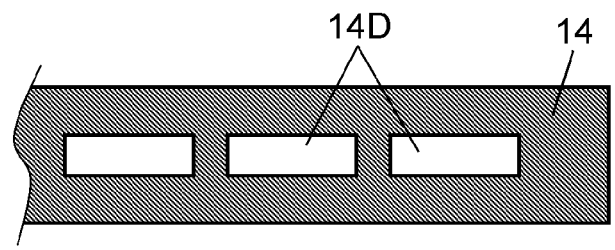
Figure 9C:
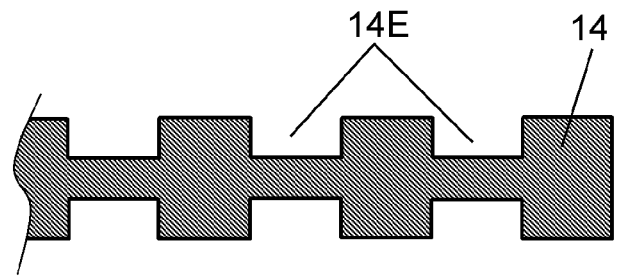

It is preferable that upper electrodes 14 and lower electrodes 17, with their width exceeding 0.5 mm, are provided with opening 14C as shown in FIG. 9A or openings 14D as shown in FIG. 9B. Alternatively, it is preferable that electrodes 14 and 17 be provided with notches 14E as shown in FIG. 9C. Either one of these manners makes electrodes 14 and 17 to have width of partly 0.5 mm or less thereby light such as ultraviolet light can transmit through opening 14C, openings 14D or notches 14E. Such a shape of electrodes 14 and 17 prevents the above defect to reliably harden upper bonding layer 31 and lower bonding layer 32.

With the bottom surface of protective layer 18 in a mirror-smooth state with a surface roughness of 0.0001 to 0.5 μm and undulation of 0.001 to 10 μm, external light such as sunlight and fluorescent light is uniformly reflected on the bottom surface of protective layer 18. This prevents images on the display element behind the touch panel from being seen as deformed, thus allowing a user to view images easily and to operate the device reliably.

Meanwhile, not only when forming protective layer 18, but when hardening upper bonding layer 31 and lower bonding layer 32, it is preferable that the layers be placed on a glass plate or a fluorine-coated metal plate and hardened with pressure slightly exerted, which prevents upper conductive layers 13 and lower conductive layers 16 from being deformed.

Further, the outer circumferential front ends of upper electrodes 14 and lower electrodes 17 are connected to a flexible wiring board and/or a connector. Accordingly, upper resin layer 12 and lower resin layer 15 are not usually formed on the ends of electrodes 14 and 17, and thus the ends are exposed. Here, conductive layers 14B and 17B (e.g. indium tin oxide) are laminated thereon with layers 14A and 17A (e.g. copper foil), which prevents layers 14B and 17B from corroding due to moisture or the like, allowing electrodes 14 and 17 to be stably connected to the outside.

Upper electrodes 14 and lower electrodes 17 may be formed by first forming the electrode patterns on the top surfaces of upper base plate 22 and lower base plate 23 by printing using such as silver and carbon, and then transferring the electrode patterns onto the bottom surfaces of upper bonding layer 31 and lower bonding layer 32. However, as described above, it is preferable that electrodes 14 and 17 be formed by layering metal layers 14B and 17B (e.g. copper foil) onto conductive layers 14A and 17A (e.g. indium tin oxide). Layers 14B and 17B (e.g. copper foil) with this configuration prevents blurs and smudges in upper electrodes 14 and lower electrodes 17, thus retaining a low, stable resistance. Furthermore, electrodes 14 and 17 can be formed with their width and interval as small as around 0.03 to 0.05 mm.

Metal layers 14B and 17B may be formed by plating silver, nickel or the like. In this case, after forming metal thin film 21 by plating over the entire top surface of conductive thin film 20 (e.g. indium tin oxide), upper electrodes 14, lower electrodes 17, and others are formed by etching. Alternatively, after forming conductive layers 14A and 17A by etching, layers 14B and 17B are formed on the conductive layers by plating.

Further, the above description is made of the configuration in which upper conductive layers 13, lower conductive layers 16, and conductive layers 14A and 17A are formed of indium tin oxide or tin oxide and the like. Otherwise, substantially strip-shaped conductive layers 13 and 16 and the other parts may be formed of one of ultraviolet curable acrylate resin, thermosetting epoxy resin, or light-transmissive resin (e.g. urethane resin), with conductive polymer (e.g. polythiophene), nanotubes (e.g. carbon), or nanowires (e.g. silver) dispersed thereinto. In this case, a touch panel with flexibility (bendable to a certain degree) can be produced. Furthermore, the panel has a total light transmittance of 92% to 93%, which means higher light transmittance.

In the configuration shown in FIGS. 8A and 8B, upper bonding layer 31 is stuck onto the bottom surface of cover substrate 25 that is provided with decorated part 25A on the outer circumferential bottom surface and has an elevation of around 10 to 50 μm at the position of decorated part 25A. In this case, it is preferable to select a material having a pre-hardening storage modulus of 0.05 to 5 MPa and a post-hardening of 1 to 100 GPa for upper bonding layer 31 and lower bonding layer 32. Upper bonding layer 31 can be stuck firmly without forming any gap onto the bottom surface of cover substrate 25 by sticking layer 31 while soft and then hardening it. Further, this manner facilitates handling and shortens the sticking work compared to a case of using a liquid adhesive or the like before hardening.

In the description with reference to FIGS. 5A and 5C, upper bonding layer 31 and lower bonding layer 32 are hardened before upper base plate 22 and lower base plate 23 are detached. However, if upper base plate 22 can be peeled off from upper bonding layer 31, and lower base plate 23 can be peeled off from lower bonding layer 32, the following steps may be adopted. That is, lower bonding layer 32 is laminated without hardening upper bonding layer 31, and subsequently, upper bonding layer 31 and lower bonding layer 32 simultaneously are hardened. However, for metal layers 14B and 17B formed by sputtering, they have a low strength, thus are possibly broken even if slightly deformed due to the detachment of upper base plate 22 and lower base plate 23. For this reason, it is preferable that upper bonding layer 31 and lower bonding layer 32 be hardened before upper base plate 22 and lower base plate 23 are detached.

As described above, a touch panel according to this embodiment includes cover substrate 11 (or cover substrate 25), upper resin layer 12, strip-shaped upper conductive layers 13, lower resin layer 15, strip-shaped lower conductive layers 16, and protective layer 18. Upper resin layer 12 is formed on cover substrate 11. Upper conductive layers 13 are in contact with upper resin layer 12 on the side opposite to cover substrate 11 and are arranged in a first direction. Lower resin layer 15 is in contact with layers 13 and upper resin layer 12. Lower conductive layers 16 are provided on the surface of lower resin layer 15 opposite to layers 13 with lower resin layer 15 placed between layers 16 and 13 and are arranged in a second direction orthogonal to the first direction. Protective layer 18 is provided on the surface of lower resin layer 15 on which layers 16 are formed. Each of upper resin layer 12 and lower resin layer 15 is formed of a uniform material. In other words, film-like upper substrate and lower substrate are not used, but upper resin layer 12 and upper conductive layers 13 are directly joined together, and lower resin layer 15 is directly joined to the bottom surface of layers 12 and 13. Then, lower conductive layers 16 are provided via lower resin layer 15. This structure makes the touch panel thinner as a whole and increases the light transmittance. Consequently, a user can easily view images on the display element behind the touch panel. In this way, a touch panel that allows reliable, easy operation can be produced.

It is preferable that at least one of upper resin layer 12 and lower resin layer 15 have a Martens hardness of 1 N/mm$^2$ or greater. This prevents the surfaces from being uneven, and upper conductive layers 13 and upper electrodes 14 from being damaged, thus allowing upper base plate 22 and lower base plate 23 to be easily detached from upper resin layer 12 and lower resin layer 15.

It is preferable that the surface of protective layer 18 opposite to lower resin layer 15 have a surface roughness of 0.5 μm or less. This allows external light to be uniformly reflected and prevents images on the display element behind the touch panel from being seen as deformed.

A method of producing such a touch panel includes the following steps.

Forming upper conductive layers 13 arranged in a first direction on upper base plate 22. Forming upper bonding layer 31 on upper base plate 22 so as to cover layers 13. Transferring upper conductive layers 13 and upper bonding layer 31 from upper base plate 22 onto cover substrate 11. Forming lower conductive layers 16 on lower base plate 23. Forming lower bonding layer 32 on lower base plate 23 so as to cover layers 16. Bonding lower conductive layers 16 and lower bonding layer 32 onto the surfaces of upper conductive layers 13 and upper bonding layer 31 from which surfaces upper base plate 22 has been detached. In this step, layers 16 are arranged so that lower bonding layer 32 directly contacts layers 13 and 16 between layers 13 and 16, and at the same time layers 16 are arranged in a second direction orthogonal to the first direction. Forming protective layer 18 on the surfaces of lower conductive layers 16 and lower bonding layer 32 from which surfaces lower base plate 23 has been detached. Each of upper resin layer 12 and lower resin layer 15 is formed of a uniform material. Such a method allows producing a touch panel according to this embodiment relatively easily.

Here, when transferring upper conductive layers 13 and upper bonding layer 31 onto cover substrate 11, upper conductive layers 13 and upper bonding layer 31 are stuck onto cover substrate 11, first. Then, upper bonding layer 31 is hardened to form upper resin layer 12 and upper base plate 22 is detached from upper resin layer 12. Doing this way is preferable. This procedure allows upper base plate 22 to be detached easily.

Further in the above producing procedure, when lower conductive layers 16 and lower bonding layer 32 are bonded onto upper conductive layers 13 and upper bonding layer 31, upper conductive layers 13 and upper bonding layer 31 are transferred onto cover substrate 11, first. After that, lower conductive layers 16 and lower bonding layer 32 are transferred from lower base plate 23 onto layers 13 and upper resin layer 12. Then, lower bonding layer 32 is hardened to form lower resin layer 15 and lower base plate 23 is detached from lower resin layer 15. Doing this way is preferable. This procedure allows lower base plate 23 to be detached easily.

Alternatively, before transferring upper conductive layers 13 and upper bonding layer 31 from upper base plate 22 onto cover substrate 11, upper base plate 22 is detached from upper conductive layers 13 and upper bonding layer 31, first. Then, lower conductive layers 16 and lower bonding layer 32 are transferred from lower base plate 23 onto the surfaces of upper conductive layers 13 and upper bonding layer 31 from which surfaces upper base plate 22 has been detached. Then, after bonding upper conductive layers 13 and upper bonding layer 31 onto cover substrate 11, upper bonding layer 31 and lower bonding layer 32 are simultaneously hardened. This procedure is also adopted.

Further in the above producing procedure, before transferring lower conductive layers 16 and lower bonding layer 32 from lower base plate 23 onto the surfaces of upper conductive layers 13 and upper bonding layer 31 from which surfaces upper base plate 22 has been detached, protective layer 18 is formed. Protective layer 18 is formed on the surfaces of lower conductive layers 16 and lower bonding layer 32 from which surfaces lower base plate 23 has been detached. This procedure is also adopted.

As described above, a touch panel according to the present embodiments allows a user to view images on the display element behind the touch panel easily and to operate the device easily and reliably. Further, a producing method according to the present embodiments allows the above touch panel to be produced easily. The touch panel is useful mainly for operating various types of electronic devices.

What is claimed is:

1. A touch panel comprising:
    an upper resin layer;
    a plurality of upper conductive layers in contact with the upper resin layer;
    a lower resin layer in contact with the upper conductive layers and the upper resin layer; and
    a plurality of lower conductive layers in contact with a surface of the lower resin layer opposite to a surface in contact with the upper conductive layers, the lower resin layer disposed between the upper conductive layers and the lower conductive layers,
    wherein a thickness of each of the upper resin layer and the lower resin layer is greater than or equal to 10 μm or less than 50 μm, and
    at least one of the upper resin layer and the lower resin layer has a Martens hardness of 1 N/mm$^2$ or greater.

2. The touch panel according to claim 1, further comprising a protective layer provided on a surface of the lower resin layer on which the lower conductive layers are formed, wherein the protective layer at a side opposite to the lower resin layer has a surface roughness of 0.5 μm or less.

3. The touch panel according to claim 1, wherein each of the upper resin layer and the lower resin layer comprises a uniform material.

4. The touch panel according to claim 1, further comprising:
    a cover substrate in contact with a surface of the upper resin layer; and
    a protective layer provided on a surface of the lower resin layer,
    wherein the touch panel has a light transmittance of 91% or greater.

5. A touch panel comprising:
    an upper resin layer;
    a plurality of upper conductive layers in contact with the upper resin layer;
    a lower resin layer in contact with the upper conductive layers and the upper resin layer;
    a plurality of lower conductive layers in contact with a surface of the lower resin layer opposite to a surface in contact with the upper conductive layers, the lower resin layer disposed between the upper conductive layers and the lower conductive layers;
    a cover substrate in contact with a surface of the upper resin layer opposite to a surface in contact with the upper conductive layers; and
    a protective layer in contact with the lower conductive layers and the lower resin layer,
    wherein a thickness of each of the upper resin layer and the lower resin layer is greater than or equal to 10 μm or less than 50 μm, and
    the touch panel has a light transmittance of 91% or greater.

6. The touch panel according to claim 5, wherein the protective layer at a side opposite to the lower resin layer has a surface roughness of 0.5 μm or less.

7. The touch panel according to claim 5, wherein each of the upper resin layer and the lower resin layer comprises a uniform material.

* * * * *